May 1, 1934.  L. IVERSEN  1,956,952
METHOD AND APPARATUS FOR SHEARING
Filed Aug. 16, 1932    3 Sheets-Sheet 3

INVENTOR
Lorenz Iversen
by his attorneys
Byrnes, Stebbins, Parmelee & Brenko

Patented May 1, 1934

1,956,952

UNITED STATES PATENT OFFICE 1,956,952

METHOD AND APPARATUS FOR SHEARING

Lorenz Iversen, Pittsburgh, Pa., assignor to Mesta Machine Company, Homestead, Pa., a corporation of Pennsylvania Application August 16, 1932, Serial No. 628,997

5 Claims. (Cl. 80—3)

The present invention relates broadly to the art of material cutting, and more particularly to the cutting of metal strip and the like as it is delivered from a mill.

This application is a continuation in part of my copending application, Serial No. 488,262, filed October 13, 1930, for Method and apparatus for shearing.

It is customary in the metal working art to provide flying shears the speed of which is governed electrically by the speed of a mill or by the speed of material delivered from a mill in such a way that the cutting speed of the shear is maintained in a predetermined relationship to the delivery speed of the material. One form of apparatus by means of which such governing is effected is diclosed in my United States Patent No. 1,954,132. While such a system accomplishes the results desired, it will be apparent to those skilled in the art that any means of governing electrically the cutting speed of the shear to maintain a predetermined relationship with the speed of the mill or the delivery speed of the material must of a necessity be somewhat inaccurate because a governing device cannot anticipate but must follow with a greater or less time lag any incipient change in the speed of the mill or of the material delivered from the mill. Also it will be apparent to those skilled in the art that the different pieces of apparatus required, make the complete system expensive and difficult to maintain.

It has heretofore not been feasible to attempt to provide a constantly operated shear acting directly on material as delivered by the mill without speed governing means, for the reason that changes in the speed of delivery resulted in producing a relative holding back or advancing of the material with respect to the shear, whereby the pieces cut were not of uniform length.

In an effort to obviate these objections, it has been proposed to provide pinch rolls in combination with the shear, the purpose of which is to obtain greater accuracy of feeding. In the absence of governing means of the character referred to, however, in case the delivery speed is decreased, the pinch rolls exert an undue pull on the material which may result either in slippage between the pinch rolls and the material, or in tearing the material.

From the foregoing it will be apparent that it has heretofore not been feasible to provide a simple system effective for receiving material directly from a rolling mill, and shearing the same to accurate lengths. It is one of the objects of the present invention to provide means whereby such accuracy is obtained without the necessity of expensive installations of the character referred to.

In the accompanying drawings I have shown for purposes of illustration, and more or less diagrammatically, a preferred embodiment of the invention. In the drawings.

Figure 1:
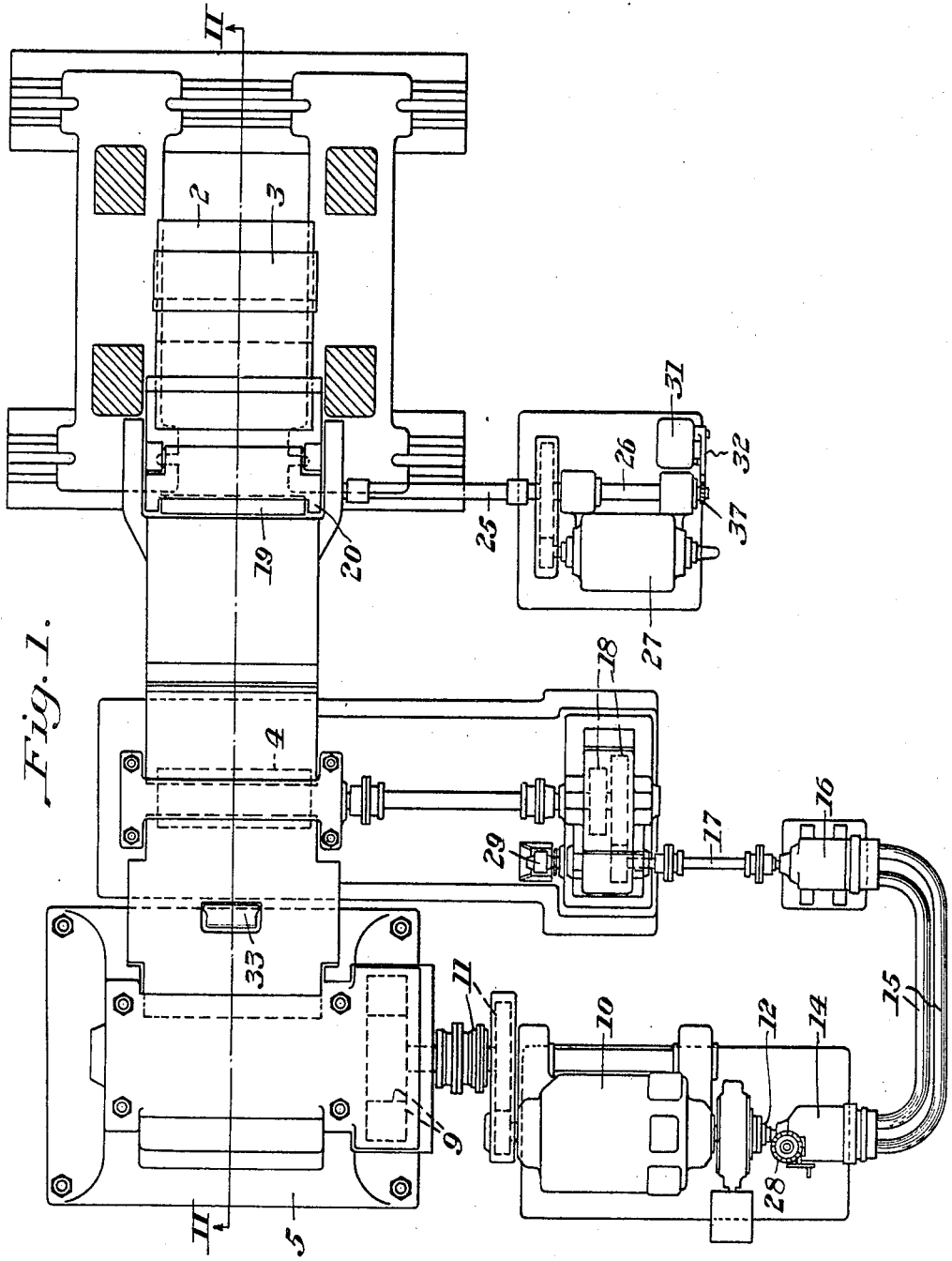
Figure 1 is a diagrammatic top plan view of one embodiment of the invention.
Figure 2:
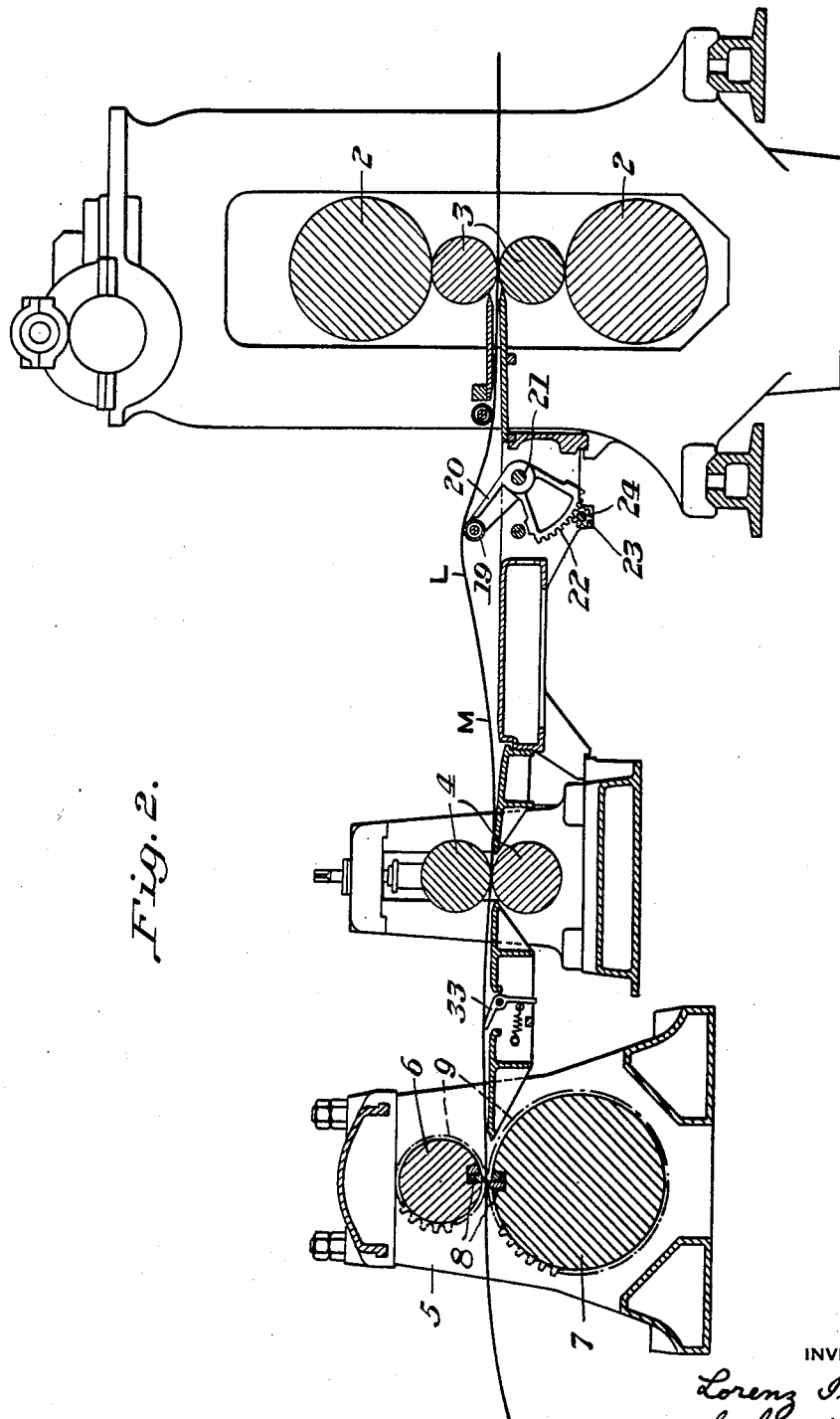
Figure 2 is a sectional view along line II—II of Figure 1.
Figure 3:
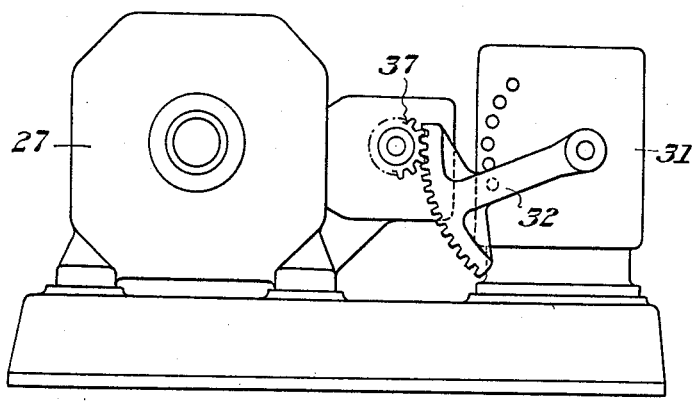
Figure 3 shows a diagrammatic side elevation of part of the same apparatus.
Figure 4:
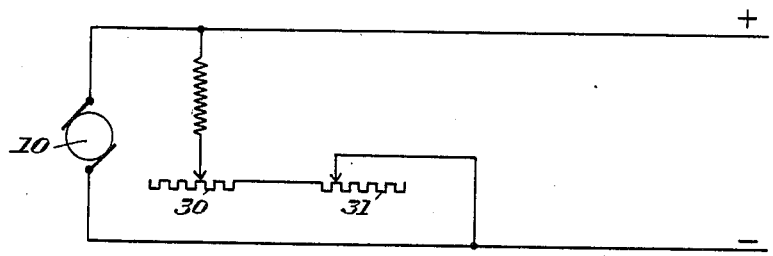
Figure 4 shows an elementary wiring diagram of the shear motor and its field rheostats.

In the drawings, there is illustrated a four-high stand of rolls including backing-up rolls 2 and working rolls 3 providing a roll pass for material M being rolled.

Adjacent the roll stand is a pair of pinch rolls 4 effective on the material in advance of a shear stand 5. The shear stand is illustrated as comprising rotors 6 and 7 each carrying a shear blade 8 and intergeared by suitable gearing 9 for rotation in uniform and in predetermined relationship.

For driving the shear there is illustrated an electric motor 10 having a driving connection 11 with one of the gears. The motor is also shown as having a second connection 12 with a hydraulic displacement pump 14 which is of any well known variable type, the displacement per revolution of which may be easily varied. The pump has pipe connections 15 with a hydraulic motor 16 provided with operative connection 17 to gearing 18 by means of which the pinch rolls 4 are driven.

With the construction just described, it will be apparent that it is possible to maintain any desired speed relationship between the pinch rolls and the shear, this relationship being variable in accordance with the adjustment of the hydraulic pump. By a proper adjustment, the pinch rolls may be relied upon to feed the material to the shears at such a constant speed that they will in effect constitute measuring means for the material such that accurate lengths will be sheared.

In order, however, to permit the use of an apparatus of the character described, I have provided loop forming means intermediate the roll stand and the pinch rolls for maintaining what may be characterized as a material reserve or surplus from which the pinch rolls may continuously draw regardless of the speed of delivery of the mill. This looping means is illustrated as comprising a roller 19 adapted to underlie the material and displace the same from its normal plane of travel and thereby form a loop L therein. Carrying the roller 19 is a looper arm 20 having a pivotal mounting 21 and carrying a gear segment 22 meshing with a pinion 23 which is provided with a suitable shaft 24 and shaft extension 25 connecting to the counter shaft 26 of an electric motor 27.

This motor is of the type known to the art as a torque motor. That is, it is capable of exerting its rated torque at a very low speed or at a standstill, or it may be forced backward by an external force in a direction opposite that in which it would normally run, without drawing an excessive current from the line. This is accomplished by properly proportioning the resistance in the armature circuit so that, with normal voltage impressed on the armature circuit, a current of normal value is drawn from the line even though the counter electromotive force is negligible or zero.

At the commencement of a rolling operation, the delivery of the variable displacement hydraulic pump 14 is first adjusted so as to give the ratio of speeds between tips of the shear blades mounted on shear rotors 6 and 7, and the periphery of the pinch rolls 4 which will effect the desired length of cut. This is preferably accomplished by setting the dial 28 (which is suitably graduated in figures indicating the lengths cut for different settings) to the desired length, which gives the required ratio of speeds, the length cut being a function of this speed ratio and the circumferential travel of the shear knives between cuts.

When the above speed ratio has been correctly set, the speed of the motor 10 driving the shear and pinch rolls is set by means of a conventional field rheostat 30 which controls the speed of motor 10 so that the peripheral speed of the pinch roll 4 is approximately the same as the known delivery speed of the material. An indicating tachometer 29 suitably geared to the pinch roll drive is preferably provided to conveniently register the peripheral speed of the pinch rolls.

It will be apparent to those skilled in the art that if the peripheral speed of the pinch rolls is greater than the delivery speed of the material, the pinch rolls will exert a pull on the material which will result either in slippage between the pinch rolls and the material or in stretching or even rupture of the material. It will be further apparent that if the peripheral speed of the pinch rolls is slightly less than the delivery speed of the material, a surplus or reserve will accumulate between the mill and the pinch rolls which will effectively preclude the possibility of slippage, stretch or rupture of the material.

It is the function of the looper arm 20 and roller 19 to lift this surplus material and thereby form a loop L which will gradually grow in extent as long as the aforesaid speed relationship between the pinch rolls and the mill is maintained. If the speed of the pinch rolls and shear is increased slightly, the loop will be pulled down against the thrust of the looper arm. If the speed of the pinch rolls is made to correspond exactly with the delivery speed of the material, the loop, once formed, will neither increase nor decrease in extent but will be maintained constant, the torque of the motor being sufficient to lift the looper arm and the weight of the material, the looper roller pressing upwardly against the material with sufficient force to maintain the loop but not hard enough to stretch or rupture the material. When the loop increases, the looper arm will follow due to the torque of the motor, constantly exerted. When the loop decreases, the motor will be forced backward while exerting a torque in the direction required to maintain the loop. When the loop is held constant due to a perfect matching of speeds, the motor, though at a standstill, will continue to exert approximately the same torque.

It will be apparent, therefore, that my invention provides effective means for utilizing, immediately behind a mill, a flying shear of the type described with feeding means independent of the mill but arranged to maintain a predetermined speed relationship with the shear while at the same time precluding the possibility of slippage, stretch or rupture of the material and maintaining under control at all times the magnitude of the loop.

In practice, the control of the loop may be either manual or automatic. If manual, the operator will set the peripheral speed of the pinch rolls, as indicated by the tachometer, slightly below the known delivery speed of the material. The looper arm is initially in its lower position to permit unobstructed passage of material from the mill to the pinch rolls. As soon as the leading end of the material engages the pinch rolls a loop will begin to form. The operator will then throw the two point master switch 38 against contact 39 in the looper motor control circuit thereby energizing contactor coils 34 to close contacts 35 in the armature circuit of the looper motor which causes the motor to exert its torque in the direction required to lift the looper arm against the material. When the loop has attained a suitable size, the operator will slightly increase the speed of the shear by means of the conventional field rheostat 30 of motor 10 until the loop is stationary but of a size sufficient to provide the aforesaid requisite surplus. The operator will then maintain this loop allowing it to increase or decrease slightly as desired by a corresponding manipulation of field rheostat 30 controlling the speed of motor 10.

Figure 5:
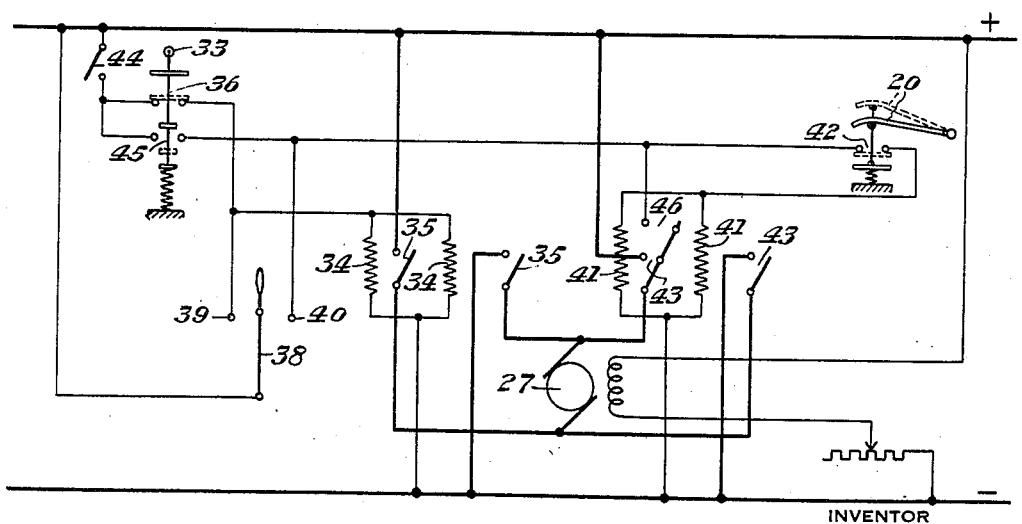
Figure 5 shows an elementary wiring diagram of the looper motor with manual and flag-operated starting switches.

After the trailing end of the material has passed over the looper the operator will lower the looper arm by throwing the master switch 38 away from contact 39 and against contact 40, holding it there momentarily and thereby de-energizing coils 34 to open contacts 35. Contact being made momentarily at 40 by the master switch, the control circuit is completed through contactor coils 41, limit switch 42 being closed as long as the looper arm 20 is up as shown diagrammatically by dot and dash lines on Figure 5. Coils 41 being energized, contacts 43 of the armature circuit of the looper motor close, thereby reversing the looper motor to lower the looper arm. Contact 46 completes a holding circuit for coils 41. When the looper arm reaches its lowest position as shown in full lines in Figure 5, limit switch 42 is opened and the control circuit thereby broken to open contacts 43 of the armature circuit.

For alternative automatic control of the looper motor, I have provided a flag 33 in the path of the strip between the pinch rolls and the shear. The automatic control is put into operation by closing switch 44. The looper arm is initially in its lower position as before. Flag 33 (shown diagrammatically on Figure 5) when depressed by the leading end of the material passing over it, closes contacts 36 thereby completing the control circuit through contactor coils 34 to close contacts 35 thereby causing the looper motor to exert its torque and lift the looper arm against the material. Contacts 45 close momentarily but produce no effect since limit switch 42 is open when its looper arm is in its initial down position.

I have also alternatively provided for automatic control of the shear speed and, therefore, the size of the loop by connecting an auxiliary field rheostat 31 in series with the main field rheostat 30 of the shear motor 10. Rheostat 31 carries an arm and gear segment 32 which meshes with a pinion 37 on the looper motor countershaft in such a way that the upward angular travel of the looper arm between the lower and upper mechanical limits of its movement gradually cuts in resistance in the field circuit of motor 10 and causes the motor 10 to speed up, and vice versa. This resistance should be so proportioned that the change in speed of the motor resulting from the movement of the rheostat 31 throughout its entire range should be amply sufficient to take care of the ordinary relative variations in speed of the main mill motor and the shear motor 10 due to their unavoidably imperfect regulation and also such other variations as would naturally result in practice from such causes as slight changes in gauge, temperature or speed of the delivered material, from whatever cause.

For a radically different set up of delivery speed from the mill, the main rheostat 30 should be used to give approximately the correct speed of motor 10, the auxiliary rheostat serving the purpose of automatically taking care of the incidental fluctuations in speed aforementioned. If the looper arm 20 fluctuates too high in its range, it can be corrected by the operator by temporarily speeding up the pinch rolls and shear slightly by manipulating rheostat 30. If the looper fluctuates too low in its range, the operator should temporarily slow down motor 10 slightly to provide a little more surplus material in the loop. Once set, the automatic control of the rheostat 31 by means of the looper arm is sufficient to maintain the loop within suitable limits, the size of the loop fluctuating slightly and automatically with the unavoidable changes aforementioned.

As the rear end of the material passes over flag 33, the flag rises due to the spring supporting it, opens contacts 36 and immediately thereafter closes contacts 45 momentarily while passing over or between them. Contacts 36 being opened, coils 34 are de-energized and open main contacts 35. Contacts 45 being closed momentarily and limit switch 42 being closed, the control circuit is completed through coils 41 which close main contacts 43 for a reversal of the torque motor. Contacts 46 provide a holding circuit whereby coils 41 remain energized even though the control circuit is broken at 45 after a momentary contact sufficient to establish the holding circuit.

The looper arm is brought down by the reversal of the looper motor under control of contacts 43 until limit switch 42 opens the control circuit and stops the downward movement by opening the armature circuit again at contacts 43. The cycle is repeated automatically by the passing of the leading end of another strip over the flag.

While the apparatus just disclosed illustrates a preferred embodiment of my invention, other means may be used for sustaining the loop as for example a cylinder and piston adapted to work with fluid pressure to raise the looper arm. It should also be understood that while I prefer to form the loop upwardly from the horizontal plane of the roll pass, a loop formed downwardly from the plane of the roll pass could be used with equal success.

I claim:

1. Material working apparatus comprising a mill for rolling metallic lengths, a shear adapted to cut material issuing from said mill, a looper for supporting a loop of material between the mill and the shear, said looper being mounted for rotary movement, and means for normally exerting a substantially constant torque on said looper sufficient to support the loop of material but insufficient to prevent lowering of the looper by the tension in the material.

2. The invention defined by claim 1 wherein said torque-exerting means is constituted by a reversible motor capable of exerting normal torque at standstill.

3. The invention defined by claim 1 wherein said torque-exerting means is constituted by a reversible motor capable of exerting normal torque at standstill, and a flag switch so positioned as to be actuated by material advancing from the mill to the shear, effective to control said motor.

4. The invention defined by claim 1 wherein said torque-exerting means is constituted by a reversible motor capable of exerting normal torque at standstill, and a flag switch so positioned as to be actuated by material advancing from the mill to the shear, effective to control said motor, said flag switch being effective on the passage of the trailing end of a piece of material, to reverse said motor and retract the looper.

5. Material working apparatus comprising a mill for feeding lengths, a shear adapted to cut material issuing from said mill, a looper supporting a loop of material between the mill and shear, said looper being mounted for movement transversely of the path of the material, and means for normally exerting a substantially constant force on said looper sufficient to support the loop of material but insufficient to prevent movement of the looper by the tension in the material.

LORENZ IVERSEN.